(12) United States Patent
Isaac (10) Patent No.: US 11,398,149 B1
(45) Date of Patent: Jul. 26, 2022

(54) CROSSWALK DETECTION USING HIGH-FREQUENCY TRANSMITTERS

(71) Applicant: Arity International Limited, Belfast (IE)

(72) Inventor: Emad Isaac, Chicago, IL (US)

( * ) Notice: Subject to any disclaimer, the term of this patent is extended or adjusted under 35 U.S.C. 154(b) by 0 days.

(21) Appl. No.: 17/360,361

(22) Filed: Jun. 28, 2021

(51) Int. Cl.
| | | |
|---|---|---|
| G08G 1/005 | (2006.01) | |
| G08G 1/04 | (2006.01) | |
| G08G 1/09 | (2006.01) | |
| G08G 1/056 | (2006.01) | |
| G01S 15/08 | (2006.01) | |
| H04M 1/72463 | (2021.01) | |

(52) U.S. Cl.
CPC ............. *G08G 1/005* (2013.01); *G01S 15/08* (2013.01); *G08G 1/04* (2013.01); *G08G 1/056* (2013.01); *G08G 1/09* (2013.01); *H04M 1/72463* (2021.01)

(58) Field of Classification Search
None
See application file for complete search history.

(56) References Cited

U.S. PATENT DOCUMENTS

| | | | |
|---|---|---|---|
| 5,708,421 A | 1/1998 | Boyd | |
| 6,304,179 B1 | 10/2001 | Lotito et al. | |
| 6,492,906 B1 | 12/2002 | Richards et al. | |
| 7,015,824 B2 | 3/2006 | Cleveland et al. | |
| 8,159,338 B2 | 4/2012 | Breed | |
| 9,843,777 B2 | 12/2017 | Schofield et al. | |
| 9,963,145 B2 | 5/2018 | Penilla et al. | |
| 10,068,473 B1 | 9/2018 | Harrison et al. | |
| 10,139,827 B2 | 11/2018 | Charette et al. | |
| 10,493,911 B2 | 12/2019 | Lopez-Hinojosa et al. | |
| 10,598,782 B2 | 3/2020 | Kim et al. | |
| 11,194,329 B2* | 12/2021 | Lehtiniemi | G08G 1/005 |
| 11,257,370 B2* | 2/2022 | Aoude | G08G 1/166 |
| 2010/0039291 A1 | 2/2010 | Harrison et al. | |
| 2021/0338517 A1* | 11/2021 | Taniguchi | A61H 3/061 |

FOREIGN PATENT DOCUMENTS

| | | |
|---|---|---|
| CN | 107757475 A | 3/2018 |
| ES | 2357267 A1 | 4/2011 |
| JP | 2015101332 A | 6/2015 |

(Continued)

OTHER PUBLICATIONS

"Concept Android Auto App Alerts You of Pedestrians Before You See Them", https://www.androidpolice.com/2020/01/10/concept-android-auto-app-alerts-you-of-pedestrians-before-you-see-them/, May 5, 2020, 4 pages.

(Continued)

*Primary Examiner* — John F Mortell
(74) *Attorney, Agent, or Firm* — Polsinelli PC (57) ABSTRACT

Aspects of the disclosure relate to detecting crosswalk using high-frequency transmitters. A mobile device may receive an ultrasonic signal indicating a location of the crosswalk from a signal transmitter. The mobile device may monitor a distance to the crosswalk based on the ultrasonic signal. The mobile device may generate an alert that the user is proximately located to the crosswalk after the user is in a predetermined vicinity of the crosswalk. The mobile device may update the alert to indicate a traffic pattern after the user has entered the crosswalk.

20 Claims, 5 Drawing Sheets

(56) References Cited

FOREIGN PATENT DOCUMENTS

KR      20160050285 A    5/2016
WO       2019048332 A1   3/2019

OTHER PUBLICATIONS

Van Groeningen, et al., "An Ultrasonic Sensor for Human Presence Detection to Assist Rescue Work in Large Buildings", ISPRS Annals of the Photogrammetry, Remote Sensing and Spatial Information Sciences, vol. IV-4/W7, 2018, 3rd International Conference on Smart Data and Smart Cities, Oct. 4-5, 2018, Delft, The Netherlands, 7 pages.

Hardiyanto, "Pedestrian Crossing Safety System at Traffic Lights based on Decision Tree Algorithm" (IJACSA) International Journal of Advanced Computer Science and Applications, vol. 10, No. 8, 2019, 5 pages.

Branquinho, et al., "An Efficient and Secure Alert System for VANETs to Improve Crosswalks' Security in Smart Cities", www.mdpi.com/jounal/sensors, Published: Apr. 27, 2020, pp. 1-26.

Wang, "WalkSafe: A Pedestrian Safety App for Mobile Phone Users Who Walk and Talk While Crossing Roads", https://www.semanticscholar.org/paper/WalkSafe%3A-a-pedestrian-safety-app-for-mobile-phone-Wang-Cardone/da129a9864a2b2338e6993b674b65f5bc733a9e1, 6 pages.

Wu, et al., "Cars Talk to Phones: A DSRC Based Vehicle-Pedestrian Safety System", https://ccv.eng.wayne.edu/reference/Cars%20Talk%20to%20Phones.pdf, 7 pages.

* cited by examiner

CROSSWALK DETECTION USING HIGH-FREQUENCY TRANSMITTERS

BACKGROUND

Aspects of the disclosure relate generally to signal transmissions and management of big data. In particular, aspects of the disclosure relate to detecting crosswalks using signal transmissions.

A mobile device may be a distraction when a user is engaged in activities such as texting, making phone calls, or listening to music, while crossing a busy crosswalk. Conventional systems may rely on a geolocation of the user to determine the user's whereabout. As a result, conventional systems may fail to detect in time when the user approaches a crosswalk and provide appropriate warnings to mitigate the distractions caused by the mobile device.

Aspects described herein may address these and other problems, and generally improve the quality, efficiency, and timeliness of crosswalk detections and mitigating risks.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Aspects described herein are directed towards crosswalk detection using high-frequency transmitters. In accordance with one or more embodiments, a mobile device associated with a user may receive an ultrasonic signal indicating a location of a crosswalk from a signal transmitter located at the crosswalk. The mobile device may monitor a distance from the mobile device to the crosswalk based on the ultrasonic signal. After determining, based on the distance, that the user is within a predetermined vicinity of the crosswalk, the mobile device may generate an alert indicating that the user is proximately located to the crosswalk. After determining, based on the distance, that the user has entered the crosswalk, the mobile device may update the alert to indicate a traffic pattern at the crosswalk.

In one or more instances, the mobile device may send an identifier associated with the mobile device to a gateway device at the crosswalk. For example, the identifier may include a phone number, an IP address or a media access control (MAC) address of the mobile device. The mobile device may subsequently receive promotional content or informational content associated with the user from the gateway device based on the distance.

In many aspects, when the user is within the predetermined vicinity of the crosswalk, the mobile device may generate a sound, a vibration, a ticker, a light, a banner, a pop-up message or an announcement associated with the alert to direct user's attention to the crosswalk. When the user has entered the crosswalk, the mobile device may update the alert to indicate a traffic pattern, such as a change of traffic light or an incoming vehicle at the crosswalk. The mobile device may also turn off a display screen of the mobile device until the user has crossed the crosswalk. The mobile device may determine directional information on user movement (e.g. whether the user moves towards the crosswalk or away from the crosswalk) and an alert may be generated based on the directional information.

In many aspects, the mobile device may receive a plurality of ultrasonic signals from various signal transmitters associated with a plurality of crosswalks, and each ultrasonic signal may indicate a location of the corresponding crosswalk. The mobile device may monitor distances from the mobile device to the plurality of crosswalks based on the ultrasonic signals. After determining that the user is within a vicinity of a particular crosswalk, the mobile device may generate a first alert indicating that the user is proximately located to the particular crosswalk. After determining that the user has entered the particular crosswalk, the mobile device may update the first alert to indicate a first traffic pattern at the particular crosswalk.

In many aspects, a plurality of ultrasonic signals may be received from a plurality of communication channels. Each ultrasonic signal may correspond to a signature frequency associated with a signal transmitter at a crosswalk. Alternatively, the mobile device may send a response signal to a gateway device associated with the particular crosswalk. The response signal may correspond to a signature frequency associated with the mobile device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As a general introduction, aspects described herein are directed towards detecting user movement using high-frequency ultrasonic transmitters and signals to mitigate risks caused by distractions from mobile devices at a crosswalk.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting, coupling, and the like. Computer software, hardware, and networks may be utilized in a variety of different system environments, including standalone, networked, remote-access (also known as remote desktop), virtualized, and/or cloud-based environments, among others.

Figure 1:
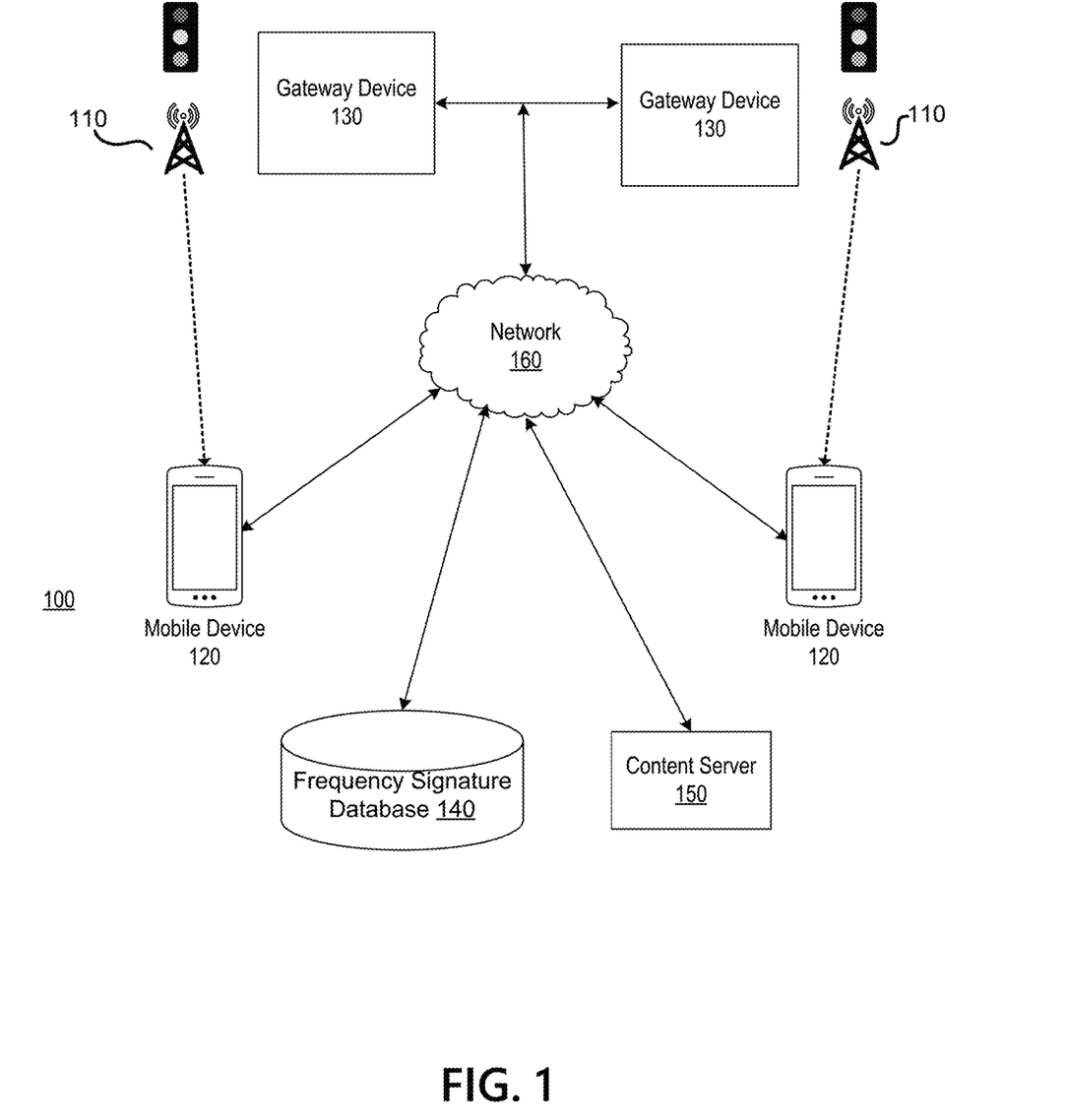
FIG. 1 shows an example of a system in which one or more aspects described herein may be implemented.

FIG. 1 depicts an illustrative system for crosswalk detection using high-frequency transmitters in accordance with one or more example embodiments. Referring to FIG. 1, computing environment 100 may include one or more computer systems. For example, computing environment 100 may include one or more signal transmitters 110, one or more mobile devices 120, one or more gateway devices 120, frequency signature database 140, and content server 150 in communication via network 160. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Signal transmitter 110 may be adapted to be placed at or near a crosswalk and may emit an ultrasonic signal with a specific frequency, which may be detected by a user device such as a mobile device. Signal transmitter 110 may emit high-frequency waves (e.g. short wavelength) ultrasonic signals. Increasing the number of waves of compression and rarefaction for a given distance may more accurately discriminate between two separate structures along the axial plane of wave propagation. For example, signal transmitter 110 may use ultrasonic signals with a frequency above 10 megahertz (MHz). Signal transmitter 110 may use a specific frequency that may serve as a frequency signature for the specific signal transmitter. Signal transmitter 100 may use a specific communication channel that is unique to the specific signal transmitter.

Signal transmitter 110 may broadcast ultrasonic signals to a group of user devices within a predefined radius of the crosswalk. Using ultrasonic sensing and transmitting, system 100 may receive unique codes from the user devices to uniquely identify a specific user device from other user devices approaching the crosswalk. System 100 may communicate with the specific user devices using unique codes and/or a specific frequency. Signal transmitter 110 may identify a user device based on the unique code and measure the distance from the signal transmitter 110 to an approaching object or a receding object such as the user device. Signal transmitter 110 may send the measurement of the distance to the corresponding user device.

User devices such as mobile device 120 may be any device that belongs to a user who may configure mobile device 120 to use crosswalk detection system 100. Mobile device 120 may receive the ultrasonic signal from signal transmitter 110 via an ultrasonic sensor on mobile device 120. Mobile device 120 may also receive information on the distance from signal transmitter 110. Mobile device 120 may monitor the distance from the mobile device to the crosswalk based on the ultrasonic signal and the received information on the distance. Mobile device 120 may determine that the user is within a predetermined vicinity of the crosswalk based on the ultrasonic signal and the distance. For example, the predetermined vicinity may be within a 10 feet or 100 feet radius of the crosswalk. Mobile device 120 may display an alert on the display screen indicating that the user is proximately located to the crosswalk. For example, mobile device 120 may determine that the user is within a ten feet radius of the crosswalk, an alert may be displayed to the user stating "you are approaching the crosswalk. Please click below to acknowledge." Mobile device 120 may also generate a sound, a vibration, a ticker, a light, a banner, a pop-up message, or an announcement with the alert to direct the user's attention to the crosswalk. Mobile device 120 may determine that the user has entered the crosswalk based on the distance, and mobile device 120 may display an updated alert to indicate a traffic pattern at the crosswalk. For example, the alert may state "be aware of incoming traffic" or "the traffic light has changed to red light." Mobile device 120 may also turn off the display screen until the user has safely crossed the crosswalk.

Mobile device 120 may determine or receive directional information of the user movement on whether the user is moving towards the crosswalk or moving away from the crosswalk. An alert may be generated when the user is moving towards the crosswalk. User devices 120 may include computing devices, such as, mobile devices, smart phones, tablets, and the like. According to some examples, user devices 130 may include hardware and software that allow them to connect directly to network 160. Alternatively, user devices 110 may connect to a local device, such as gateway device 130, a server, or other computing device, which connects to network 160.

Gateway device 130 may be adapted to be placed at or near a crosswalk. System 100 may include one or more gateway devices 130, which may be interconnected to each other or via a backhaul channel. Gateway device 130 may be connected to network 160 directly or via the backhaul channel. Gateway device 130 may identify a specific user device based on the unique code of the user device, such as a phone number of the mobile device, an IP address or a MAC address associated with the user device. Gateway device 130 may probe mobile device 120 and receive a response signal from mobile device 120 including the unique code or identifier. Gateway device 130 may retrieve promotional content or informational content associated with the user from content server 150 and send the related content to mobile device 120.

Gateway device 130 may manage frequency signatures of signal transmitter 110 or mobile device 120. Signal transmitter 110 at a first crosswalk may use a first frequency to emit the ultrasonic signal. Signal transmitter 110 at a second crosswalk may use a second frequency to emit the ultrasonic signal. Gateway device 130 may store the frequency signature and the corresponding signal transmitter in frequency signature database 140. Signal transmitter 110 may use a third frequency to communicate with a first mobile device based on the identifier of the first mobile device. Signal transmitter 110 may use a fourth frequency to communicate with a second mobile device based on the identifier of the second mobile device. Gateway device 130 may store the frequency signatures associated with the first and second mobile devices in frequency database 140.

Gateway device 130 may detect mobile devices within a building or through a city. Gateway device 130 may determine a walking or movement pattern using ultrasonic sensing. Such patterns may be used to generate recommendations related to pedestrian traffic flow management, commute route recommendations, event planning, or managing social distance in a pandemic.

Frequency signature database 140 may store data records related to mappings between a frequency signature with a corresponding signal transmitter or a mobile device. Frequency signature database 140 may receive a request from gateway device 130 and retrieve the corresponding frequency signature for a signal transmitter or a mobile device. Frequency signature database 140 may receive a request from gateway device 130 and update the corresponding frequency signature for a signal transmitter or a mobile device.

System 100 may include one or more content servers 150, which may host promotional content such as advertisement or informational content such as store operation information to be distributed to appropriate users. Gateway device 130 may retrieve the promotional or informational content tailored for a specific user or a group of users from content server 150 and send to the mobile devices associated with these users.

Signal transmitters 110, mobile devices 120, gateway devices 130, frequency signature database 140, and content server 150 may be associated with a particular authentication session. Gateway device 130 may receive, process, and/or store a variety of frequency signatures, identifiers or unique codes, promotional or informational contents and/or mapping information with frequency signature database 140 and content server 150 as described herein. However, it should be noted that any device in system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 160 may include a local area network (LAN), a wide area network (WAN), a wireless telecommunications network, and/or any other communication network or combination thereof.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
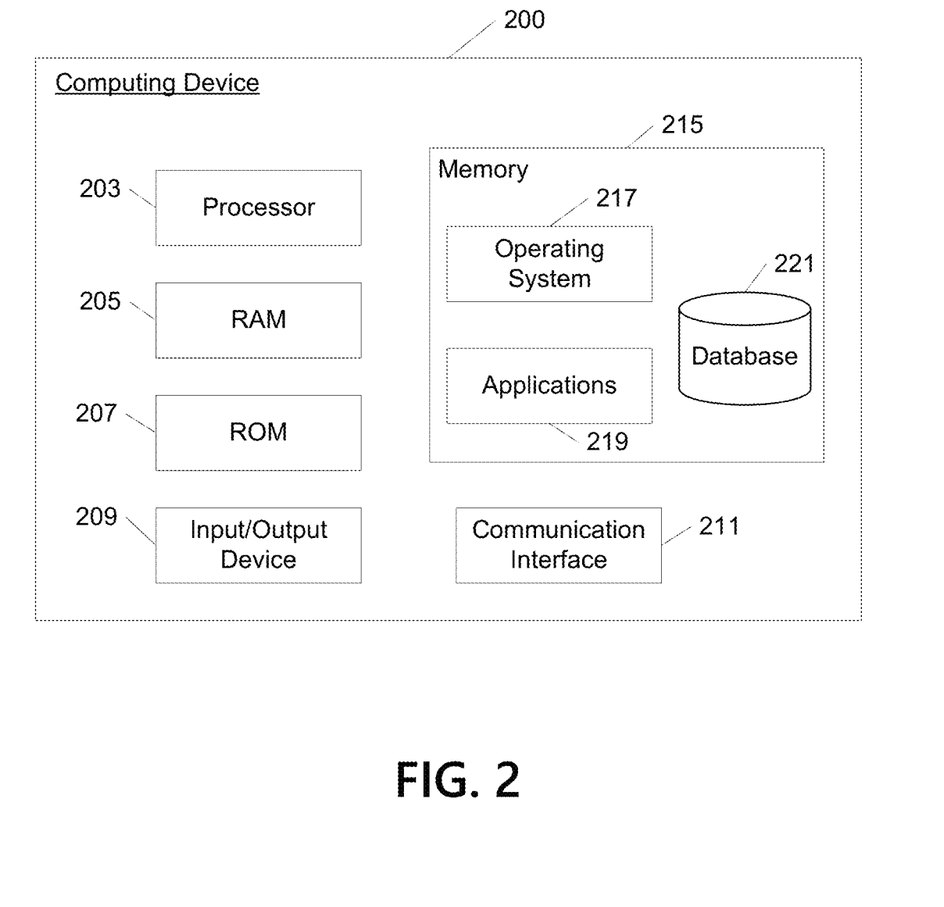
FIG. 2 shows an example of a computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device configured to perform the processes and functions described herein.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Crosswalk detection system 100 may mitigate risks associated with distractions caused by mobile devices at crosswalks. The system may detect, via ultrasonic signals emitted from a signal transmitter, the distance from a specific user to the crosswalk and generate various alerts as the user approaching the crosswalk. The system may detect walking or movement patterns of numerous users in a building or a city, and facilitate decision making in maintaining social distance and managing pedestrian traffic flow.

Figure 3:
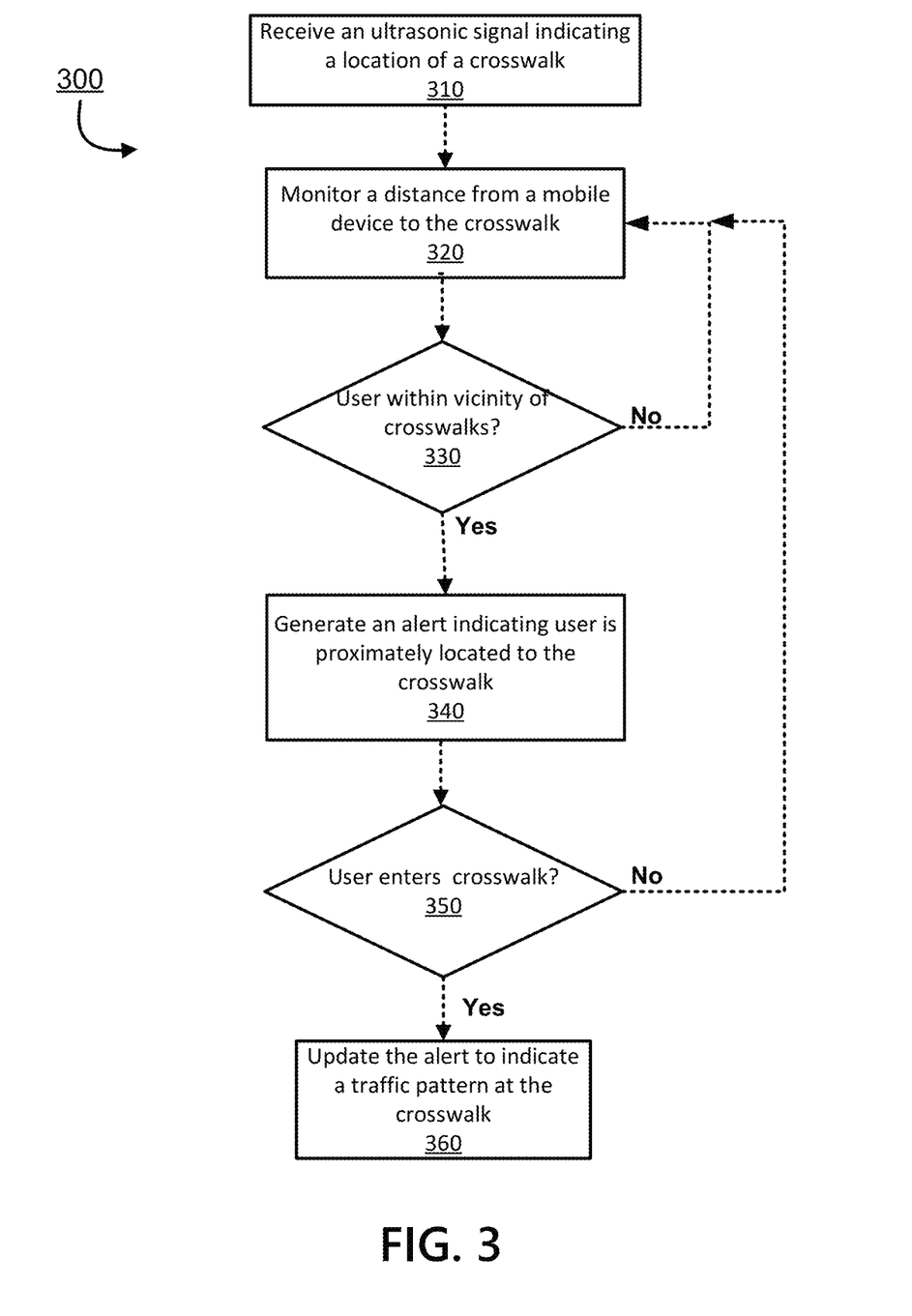
FIG. 3 depicts an illustrative method for crosswalk detection in accordance with one or more aspects of the disclosure.

FIG. 3 depicts an illustrative method for crosswalk detection in accordance with one or more aspects of the disclosure. Some or all of the steps of process 300 may be performed using one or more computing devices as described herein. In a variety of embodiments, some or all of the steps described below may be combined and/or divided into sub-steps as appropriate.

At step 310, a mobile device may receive an ultrasonic signal indicating a location of the crosswalk from a signal transmitter. The signal transmitter may be adapted to be placed at or near the crosswalk. The signal transmitter may emit high-frequency ultrasonic signals that may be more accurate than using other technologies. For example, technologies such as using radio frequency, cellular, Wi-Fi or Bluetooth signals to determine the geolocation of the crosswalk may not be range specific and may not work under certain circumstances.

High-frequency transmitters may be adapted to address the safety issues when a user may be distracted by the mobile device at the crosswalk. Many users may push a button at a crosswalk, wait for the traffic signal to change and step into the crosswalk. They may be using their mobile phone for making a call, texting, or reading an email while walking into the crosswalk and accidents may occur. As result, they may not notice a change in a traffic light or incoming traffic due to the distractions caused by the mobile devices.

The mobile device may detect the ultrasonic signal through an application running in a background of the mobile phone or through the operating system of the mobile phone. The mobile phone may include a sensor to receive the ultrasonic signal. In a variety of embodiments, the signal transmitter may determine a distance from the mobile device to the signal transmitter at the crosswalk. The signal transmitter may measure the distance using the ultrasonic signal that is transmitted to the mobile device and bounced back to the signal transmitter. The signal transmitter may send information related to the distance to the mobile device. In a variety of embodiments, the user device may determine the distance from the mobile device to the crosswalk using ultrasonic sensing techniques.

At step 320, the mobile device may monitor the distance from the mobile device to the crosswalk based on the ultrasonic signal. As the user walks towards the crosswalk or walks away from the crosswalk, the distance changes over time. The mobile device may receive the updated distance information from the signal transmitter. The mobile device may monitor the distance based on the ultrasonic signal as the user approaches the crosswalk or leaves from the crosswalk.

At step 330, the mobile device may determine whether the user is within a predetermined vicinity of the crosswalk based on the distance. If the answer is No, the process may go back to step 320, where the mobile device may continue to monitor the distance from the mobile device to the crosswalk. The predetermined vicinity may be configured by the user. For example, the user may define a radius of 10 feet or 100 feet as the vicinity of the crosswalk. The mobile device may determine whether the user is within a 10 feet or 100 feet radius of the crosswalk. If the answer is Yes, the process may go to step 340, where the mobile device may generate an alert indicating that the user is proximately located to the crosswalk. The mobile device may generate and display an alert stating that "you are approaching the crosswalk, please acknowledge." The mobile device may generate a sound, a vibration, a ticker, a light, a banner, a pop-up message or an announcement to direct the user's attention to the crosswalk. The mobile device may require the user to acknowledge the alert. If the user ignores the alert, the mobile device may temporarily cease operation until the acknowledgement is received. Alternatively, the mobile device may increase the frequency, the pitch or the volume of the sound, the vibration, the ticker, the light, the banner, or the announcement in order to get the user's attention. In some embodiments, the mobile device may display a map indicating a location of the user and the distance of the user from the crosswalk as the user approaches the crosswalk.

In a variety of embodiments, the mobile device may determine directional information related to the user's movement. For example, the mobile device may determine whether the user is moving towards the crosswalk or moving away from the crosswalk. In cases where the user is moving away from the crosswalk, the mobile device may display promotional content or other content tailored to the user. In cases where the user is moving towards the crosswalk, the mobile device may display the alert after the user moves within the vicinity of the crosswalk.

In a variety of embodiments, the mobile device may send an identifier or a unique code associated with the mobile device to the gateway device placed at or near the crosswalk. The gateway device may determine, for example, that a user's favorite restaurant or store is in close proximity of the user based on a response signal from the mobile device. The gateway device may retrieve promotional content or informational content related to the resonant or store from a content server. If the user is moving away from the crosswalk, the gateway device may determine it is safe to send such content to the user. The gateway device may subsequently send the promotional or informational content to the user's mobile device. If the user is moving towards the crosswalk and the user is within a vicinity of the crosswalk, the gateway device may determine that it is not safe to send such content to the user. The gateway device may not send the promotional or informational content to the user's mobile device until the user has safely crossed the crosswalk.

At step 350, the mobile device may determine whether the user has entered the crosswalk. If the answer is No, the process may return to step 320 to continue to monitor the distance from the mobile device to the crosswalk. If the answer is Yes, the process may go to step 360, where the alert may be updated to indicate a traffic pattern at the crosswalk. For example, the traffic pattern may include a change of traffic light from green to red. The traffic pattern may include an incoming vehicle at the crosswalk. The alert may also indicate that the display screen of the mobile device will be turned off until the user has crossed the crosswalk safely. Alternatively, the alert may be updated with increased frequency, pitch or volume of a sound, a vibration, a ticker, a light, a banner, a pop-up message or an announcement as the user move more close to the crosswalk. The alert may also include warnings for the user to look up and pay attention to the traffic at the crosswalk.

In a variety of embodiments, a user device may receive multiple ultrasonic signals from various signal transmitters at different crosswalks. The signal transmitters may identify the mobile device based on the identifier or unique code of the mobile device. The signal transmitters may each determine a distance from mobile device to the corresponding crosswalk. The signal transmitters may send the distance information to the mobile device. The mobile device may determine that it is approximately located in a particular crosswalk and send the alert to the user accordingly. As the user enters the particular crosswalk, the alert may be updated to reflect the movement of the user and to direct the user's attention to the traffic pattern at the particular crosswalk.

In a variety of embodiments, based on a frequency signature of the signal transmitter, the mobile device may determine the particular signal transmitter and crosswalk the user is approaching. A signal transmitter may broadcast ultrasonic signals to a group of mobile devices. In a variety of embodiments, based on a frequency signature of the mobile device, the gateway device may determine a particular mobile device that is approaching a particular crosswalk. The gateway device may send an alert to the mobile device and such alert may be displayed on the particular mobile device. In a variety of embodiments, the mobile device may receive ultrasonic signals originating from various signal transmitters via different communication channels. Each communication channel may be used by a specific signal transmitter.

Figure 4A:
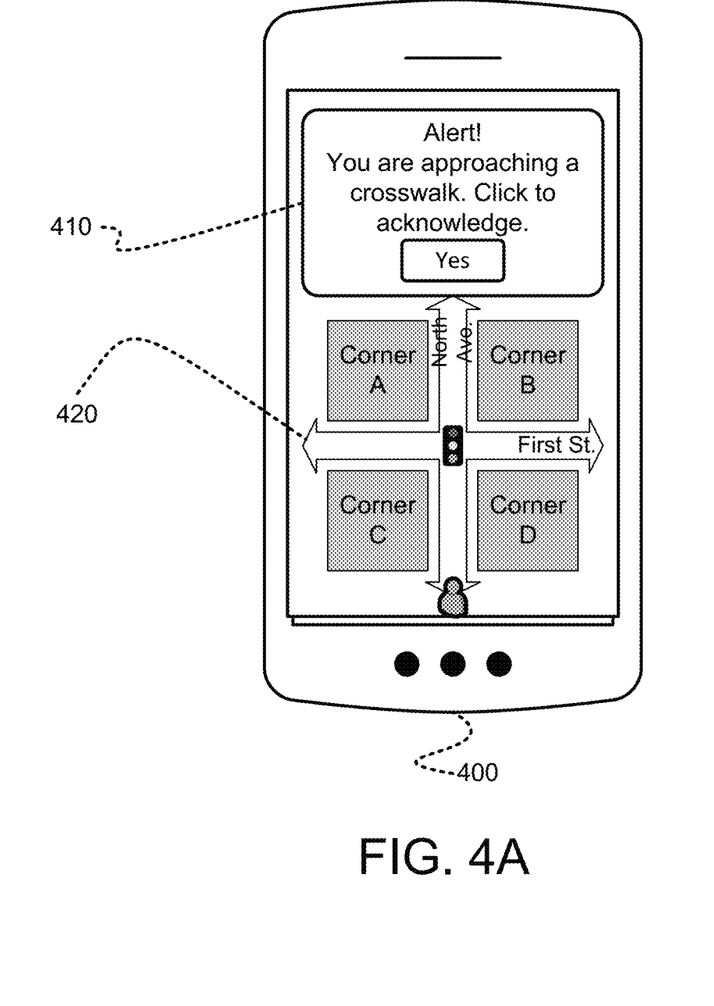
FIGS. 4A-4B show an example of a graphical user interface (GUI) for generating an alert according to one or more aspects of the disclosure.
Figure 4B:
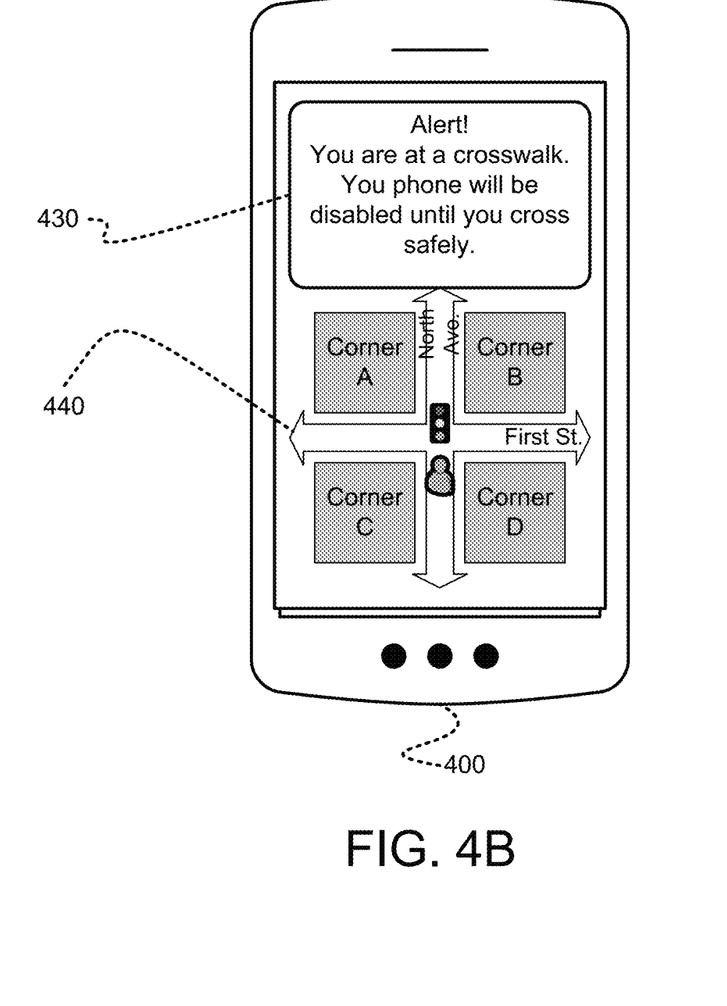

FIGS. 4A-4B show an example of a graphical user interface (GUI) for generating an alert according to one or more aspects of the disclosure. In the example illustrated in FIG. 4A, a notification 410 may be displayed on mobile device 400. As a user approaches a crosswalk at the intersection of First Street and North Ave., a determination may be made that the user is within a predetermined vicinity of the crosswalk, as shown on the map 420. An alert 410 may be displayed to state that the user is approaching a crosswalk. The alert 410 may further ask the user to acknowledge this notification to attract the user's full attention. After the user click "Yes," the alert may be dismissed. If the user fails to acknowledge the alert, the mobile device may be temporarily disabled until the user does so. Alternatively, the mobile device may display an option to ask the user to confirm that the user is not near a crosswalk and dismiss the alert.

In FIG. 4B, as the user moves more closely to the crosswalk at the intersection of the First Street and North Ave., as shown in map 440 on mobile device 440, an alert 430 may be displayed to the user to indicate that the user has entered the crosswalk. The alert may further notify the user that the phone will be disabled until the user has crossed the crosswalk safely. After a determination that the user has crossed the crossroad based on the distance between the mobile device and the crosswalk, the phone may be re-enabled automatically.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computer-implemented method comprising:
    receiving, by a mobile device associated with a user and from a signal transmitter located at a crosswalk, an ultrasonic signal indicating a location of the crosswalk;
    monitoring, by the mobile device and based on the ultrasonic signal, a distance from the mobile device to the crosswalk;
    after determining, based on the distance, that the user is within a predetermined vicinity of the crosswalk, generating an alert indicating that the user is proximately located to the crosswalk; and
    after determining, based on the distance, that the user has entered the crosswalk, updating the alert to indicate a traffic pattern at the crosswalk.

2. The method of claim 1, further comprising:
    sending, to a gateway device at the crosswalk, an identifier associated with the mobile device; and
    receiving, from the gateway device and based on the distance from the mobile device to the crosswalk, promotional content associated with the user.

3. The method of claim 1, wherein generating the alert comprises:
    generating a sound, a vibration, a ticker, a light, a banner, a pop-up message associated with the alert to direct user's attention to the crosswalk.

4. The method of claim 1, further comprising:
    after determining, based on the distance, that the user has entered the crosswalk, turning off the mobile device or a screen display of the mobile device.

5. The method of claim 1, wherein the traffic pattern comprises a change in a traffic light, or an approaching vehicle.

6. The method of claim 1, further comprising:
    determining, based on the ultrasonic signal, directional information associated with user movement in relation to the crosswalk; and
    generating the alert based on the directional information.

7. The method of claim 1, further comprising:
    receiving, by the mobile device, a plurality of ultrasonic signals associated with a plurality of crosswalks, wherein each of the plurality of ultrasonic signals indicates a location of the corresponding crosswalk;
    monitoring, based on the plurality of ultrasonic signals, distances from the mobile device to the plurality of crosswalks;
    after determining, based on the distances, that the user is within a vicinity of a particular crosswalk, generating a first alert indicating that the user is proximately located to the particular crosswalk; and
    after determining, based on the distances, that the user has entered the particular crosswalk, updating the first alert to indicate a first traffic pattern at the particular crosswalk.

8. The method of claim 7, wherein receiving the plurality of ultrasonic signals comprises receiving the plurality of ultrasonic signals via a plurality of communication channels.

9. The method of claim 7, wherein each of the plurality of ultrasonic signals corresponds to a signature frequency associated with a particular signal transmitter.

10. The method of claim 7, further comprising:
    sending, by the mobile device and to a gateway device associated with the particular crosswalk, a response signal, wherein the response signal corresponds to a signature frequency associated with the mobile device.

11. A computing device comprising:
    one or more processors;
    memory storing instructions that, when executed by the one or more processors, cause the computing device to:
        receive, from a signal transmitter located at a crosswalk, an ultrasonic signal indicating a location of the crosswalk;
        monitor, based on the ultrasonic signal, a distance from the computing device to the crosswalk;
        after determining, based on the distance, that a user associated with the computing device is within a predetermined vicinity of the crosswalk, generate an alert indicating that the user is proximately located to the crosswalk; and
        after determining, based on the distance, that the user has entered the crosswalk, updating the alert to indicate a traffic pattern at the crosswalk.

12. The computing device of claim 11, wherein the instructions, when executed by the one or more processors, cause the computing device to:
    send, to a gateway device at the crosswalk, an identifier associated with the computing device; and
    receive, from the gateway device and based on the distance from the computing device to the crosswalk, promotional content associated with the user.

13. The computing device of claim 11, wherein the instructions, when executed by the one or more processors, cause the computing device to:
    determine, based on the ultrasonic signal, directional information associated with user movement in relation to the crosswalk; and
    generate the alert based on the directional information.

14. The computing device of claim 11, wherein the instructions, when executed by the one or more processors, cause the computing device to:
    receive a plurality of ultrasonic signals associated with a plurality of crosswalks, wherein each of the plurality of ultrasonic signals indicates a location of the corresponding crosswalk;
    monitor, based on the plurality of ultrasonic signals, distances from the computing device to the plurality of crosswalks;
    after determining, based on the distances, that the user is within a vicinity of a particular crosswalk, generate a first alert indicating that the user is proximately located to the particular crosswalk; and
    after determining, based on the distances, that the user has entered the particular crosswalk, update the first alert to indicate a first traffic pattern at the particular crosswalk.

15. The computing device of claim 14, wherein the instructions, when executed by the one or more processors, cause the computing device to:
    receive the plurality of ultrasonic signals via a plurality of communication channels.

16. The computing device of claim 14, wherein each of the plurality of ultrasonic signals corresponds to a signature frequency associated with a particular signal transmitter.

17. The computing device of claim 14, wherein the instructions, when executed by the one or more processors, cause the computing device to:
send, to a gateway device associated with the particular crosswalk, a response signal, wherein the response signal corresponds to a signature frequency associated with the computing device.

18. A non-transitory computer-readable medium storing instructions that, when executed, configure a computing device to:
receive, from a signal transmitter located at a crosswalk, an ultrasonic signal indicating a location of the crosswalk;
monitor, based on the ultrasonic signal, a distance from the computing device to the crosswalk;
after determining, based on the distance, that a user associated with the computing device is within a predetermined vicinity of the crosswalk, generate an alert indicating that the user is proximately located to the crosswalk; and
after determining, based on the distance, that the user has entered the crosswalk, update the alert to indicate a traffic pattern at the crosswalk.

19. The non-transitory computer-readable medium of claim 18, wherein the instructions, when executed, configure the computing device to:
send, to a gateway device at the crosswalk, an identifier associated with the computing device; and
receiving, from the gateway device and based on the distance from the computing device to the crosswalk, promotional content associated with the user.

20. The non-transitory computer-readable medium of claim 18, wherein the ultrasonic signal corresponds to a signature frequency associated with the signal transmitter.

* * * * *